United States Patent
Verboom et al.

(10) Patent No.: US 7,248,557 B2
(45) Date of Patent: Jul. 24, 2007

(54) ROBUST HEADER CONFIGURATION AND METHOD FOR READING SECTOR IDENTIFIERS CONTAINED THEREIN

(75) Inventors: Johannes J. Verboom, Colorado Springs, CO (US); John C. Rathe, Colorado Springs, CO (US)

(73) Assignee: Plasmon LMS, Inc., Colorado Springs, CO (US)

(*) Notice: Subject to any disclaimer, the term of this patent is extended or adjusted under 35 U.S.C. 154(b) by 682 days.

(21) Appl. No.: 10/749,163

(22) Filed: Dec. 30, 2003

(65) Prior Publication Data

US 2005/0094531 A1    May 5, 2005

Related U.S. Application Data

(60) Provisional application No. 60/515,856, filed on Oct. 30, 2003.

(51) Int. Cl.
*G11B 7/24* (2006.01)

(52) U.S. Cl. .................... 369/275.3; 369/59.25

(58) Field of Classification Search .. 369/275.1–275.5, 369/59.25, 30.14, 47.31, 53.21, 124.07, 59.1
See application file for complete search history.

(56) References Cited

U.S. PATENT DOCUMENTS

| | | | |
|---|---|---|---|
| 5,237,552 A | 8/1993 | Masood et al. | |
| 5,615,205 A | 3/1997 | Belser | |
| 5,862,005 A | 1/1999 | Leis et al. | |
| 6,111,710 A | 8/2000 | Feyh et al. | |
| 6,208,603 B1 | 3/2001 | Ishida et al. | |
| 6,266,307 B1 | 7/2001 | Ishida et al. | |
| 6,269,069 B1 | 7/2001 | Ishida et al. | |
| 6,452,990 B1 | 9/2002 | Leis et al. | |
| 6,564,009 B2 * | 5/2003 | Owa et al. | 386/126 |
| 6,721,251 B2 * | 4/2004 | Kojima et al. | 369/47.54 |
| 6,804,188 B1 * | 10/2004 | Shishido et al. | 369/275.3 |
| 6,975,570 B1 * | 12/2005 | Gushima et al. | 369/47.31 |
| 2002/0067668 A1 | 6/2002 | Ishida et al. | |
| 2002/0114251 A1 | 8/2002 | Lee et al. | |

* cited by examiner

*Primary Examiner*—Ali Neyzari
(74) *Attorney, Agent, or Firm*—Oppenheimer Wolff & Donnelley LLP

(57) ABSTRACT

For the purpose of providing sector-address information on optical disks, a robust header is realized by utilizing a very simple encoding method that allows asynchronous reading. In order to provide robustness and reliability, the header uses a biphase data format to encode addressing information. The embossed header is further configured with redundant address-fields in a checkerboard pattern between adjacent tracks, in order to provide robustness for media-contamination. Each address-field starts with a unique address-mark and ends with parity-check information to provide reliable error-detection. The entire header can be decoded without the need for a slice-level, thus making it very tolerant to amplitude-variations and DC-offset variations. By combining these characteristics, a header is achieved which is reliable and inherently resistant to failures in providing sector-address information on optical disks.

22 Claims, 9 Drawing Sheets

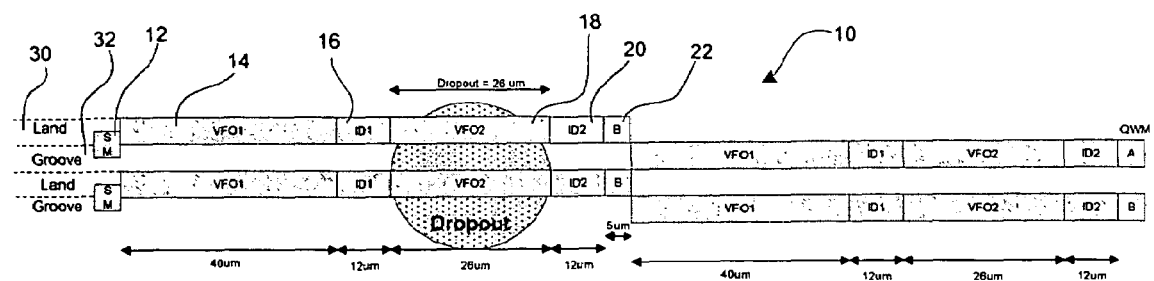
Fig. 1 - Prior Art
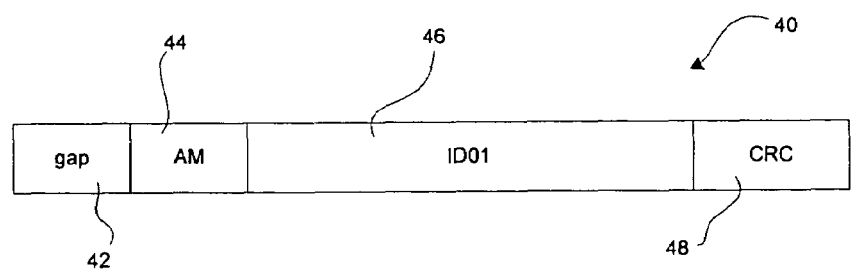
Fig. 2

Effect of dropouts

Timing for Sector Sync detect

ROBUST HEADER CONFIGURATION AND METHOD FOR READING SECTOR IDENTIFIERS CONTAINED THEREIN

CROSS-REFERENCE TO RELATED APPLICATIONS

This application claims the benefit of U.S. Provisional Application No. 60/515,856, filed Oct. 30, 2003.

BACKGROUND OF THE INVENTION

The present invention relates generally to data storage devices. More specifically, the present invention relates to a method and storage media configuration that provides for the reliable identification of data storage sectors on the storage media.

As is well known in the data storage field, data storage media is typically configured to have a plurality of sectors identified on the surface thereof, with each sector being identified by a specific address. Each sector typically has a preformatted header, which is utilized for addressing and synchronization purposes. These headers are typically preformatted and often include information (i.e., embossed data) coded in a manner that is similar to the recorded data on the media. Since the header information is coded in this manner, reading of this information is obviously done in the same manner that the actual data is read. More specifically, this typically requires first locking a PLL to the header preamble (i.e., VFO) in order to obtain appropriate synchronization. Once this synchronization is achieved, an address mark is typically detected, followed by address data, which once again is coded in a manner similar to the recorded data on the media (e.g., run length limited encoded data like 1,7 RLL code or 2,7 RLL code).

As will be appreciated, the utilization of a header with identification data stored in this format requires the use of several cooperating systems. As mentioned above, a phase-locked loop (PLL) is required in order to provide synchronization with the header. Additionally, the decoding of address data requires the use of slice levels and gain control loops to insure the information is appropriately deciphered. While each of these systems can be implemented, they are also prone to inherent errors. For example, the inaccurate maintenance of slice levels, due to defects or mark-space asymmetry, can easily result in data errors. Additionally, inaccurate PLL capture can obviously skew timing, also creating errors in reading header data. Those issues can be dealt with when reading recorded data from a storage media because the recorded data is typically protected by an Error Correction Code (ECC) and additional re-synchronization fields. Applying those same techniques to the headers would significantly increase their overhead and thus would reduce the space available for data recording. Adding ECC to the Headers would also make the drive electronics more complex. Hence headers typically only contain a simple Error-Detection method such as a Cyclic Redundancy Check (CRC).

In addition to the complexities discussed above, the typical present day header requires a very large preamble, thus limiting the amount of information which can be stored. For example, with a large preamble it is not possible to repeat the address information multiple times as there is simply not a reasonable amount of space within the designated header area. Consequently, it would be beneficial to reduce the amount of "header overhead," thus allowing additional space for more critical information, such as address information.

Referring to FIG. 1, there is shown one example of a classical header which utilizes the above-mentioned synchronization and addressing scheme. Referring specifically to FIG. 1, this classical header or RLL coded header 10 begins with a sector mark 12 which identifies the beginning of the new section. Following sector mark 12, a synchronization field 14 is utilized to allow the phase locked loop to synchronize with this section on the media. Following synchronization, an address field 16 provides a first address (ID1) for the particular section. A second synchronization field 18 is then encountered followed by a second address field 20 (ID2). Utilizing two synchronization fields and two address fields provides some redundancy in the addressing scheme.

As shown in FIG. 1, this first sequence of fields is written to the land section of the media. Next, a Quadrature Wobble Mark field 22 is encountered, which provides information about track alignment. The readout then jumps to the groove section 32 of the media. These same fields are then repeated in a checkerboard fashion. As illustrated in FIG. 1, the synchronization fields utilize a large amount of space on the media. Once again, this highlights the amount of overhead required for this synchronized header addressing methodology.

In addition to the issues related to overhead, the sector mark 12 used in this traditional header is potentially problematic. Sector mark 12 could be obscured by dust particles, making them undetectable. Should this happen, the entire sector becomes unreadable and additional operations must be initiated (e.g., relocate the sector, etc.). This same problem also arises when media defects exist.

As mentioned above, the header information is often times preformatted on the disk during the manufacturing operations. As can be appreciated, this pre-formatting must be accomplished utilizing fairly tight tolerances and specifications for the pre-formatted pits. This obviously adds to the complexity and cost of the media itself. Consequently, any effort to simplify things is very beneficial.

In addition to the above-referenced challenges, storage media itself is getting more and more complex. To increase data capacity, the density of data on the storage media is being increased using smaller and smaller marks and spaces on the media surface. In order to deal with this increase in density in optical storage systems, thinner dust defocusing cover layers are being utilized, and the optical pick-up needs to operate much closer to the media itself. While this is very effective to increase the density of the storage media, it has a detrimental effect on the media's ability to deal with contamination and dust. As can be imagined, a dust particle on the media surface will distort the readout, making the reading of data inaccurate. This distortion affects a larger region of the media when the optical pick-up is closer to the surface. The same is true for holes in the reflective layer and data replication defects. When dust or defects are encountered in a header, the address data becomes unreliable and cannot be used. Consequently, the data-sector following this address data cannot be used. This creates the need for adjustments to be made in the data storage system, such as relocation to other areas. Redundancy in the address data is one solution for this problem, but is limited by space constraints within the header. That is, the size of the header only allows address data to be repeated a limited number of times.

Furthermore, these higher densities also make it more difficult to deal with manufacturing imperfections and defects in the media itself. These defects typically affect areas on the media—sometimes large areas. The above-referenced header formats complicate the problem of those defects by containing large amounts of non-redundant information in relatively concentrated areas on the disk.

In light of the issues raised above, it would be beneficial to design a header format which is robust and reliable. This desired format would easily deal with dust and media defects, and provide an efficient use of header space. Further, the preferred header format would anticipate the issues raised by increased data density, and attempt to simplify the process of reading header information.

BRIEF SUMMARY OF THE INVENTION

In appreciation of the aforementioned challenges and complications that exist with the currently popular header formats, the present invention provides a robust and simplified header capable of achieving all addressing and sector identifying functions, while also providing increased reliability and robustness. Further, the header format of the present invention utilizes a much-simplified system for reading and decoding header information. As also further outlined below, the header format of the present invention utilizes less space, thus increasing the space on the disk for data storage. Additionally, the structure of the header itself is inherently dust and defect tolerant, thus reducing the number of necessary relocation operations.

The robust header format of the present invention includes a plurality of address blocks that are arranged in a checkerboard pattern. The address blocks are alternatively placed on both the land and groove tracks of the disk, thus providing more dust robustness. Further, the configuration of data stored in the header is specifically designed to be read asynchronously, utilizing biphase code methodologies. Consequently no slice level is necessary, nor is any phase-locked loop synchronization. Each of these features reduces the complexity of the system utilized to read and identify header information. Also, robustness is increased as the actual address information can be repeated multiple times in the same amount of space. This ability to repeat address information provides more tolerance for both contamination and defects when reading the header information.

As mentioned above, the header of the present invention is designed to be read asynchronously. Consequently, this eliminates the need for a traditional preamble which is typically used to achieve PLL synchronization. In the classical header, these preambles (or VFO sections) comprise the biggest portion of the header (approximately 71 percent of space was used for synchronization). (See FIG. 1.) Rather, the robust header of the present invention simply maintains the existing clock signal at its current level. Stated more specifically, the PLL error signal is held at zero and the existing synchronization or clock frequency is utilized. This synchronization frequency may also be based upon a wobble track on the media, or may simply be based on the previously used frequency.

In order to accommodate asynchronous reading, an address sector or field (or ID field) is utilized in the present robust header, which is uniquely configured utilizing a straightforward but effective layout. More specifically, the address fields are set up to have a predefined number of data bits or biphase cells. Each data bit is of a defined size containing a predetermined number of N channel bits (where N equals 4, 6, 8, 10, etc.). Further, each data bit is configured to have one mark and one space, where each mark and each space has a channel bit length equal to one-half of the total channel bits. Within each data bit a transition occurs in the middle thereof. Knowing that each data bit is a single biphase cell, the data bit can easily be decoded, utilizing a predetermined decoding scheme based simply on the location of the marks and spaces.

After the initial clock-phase selection has been made, a running phase shifter (RPS) can be utilized to correct any phase errors while reading the address fields. Simply stated, the RPS simply keeps the mark/space or space/mark transition in the center of the data bit section. Using this RPS, "pseudo-synchronization" of the data bits within the address mark is achieved. However, there is still no need for PLL synchronization, which often involves complex and time-consuming operations.

As mentioned above, the decoding of address data in the robust header of the present invention is very efficient and straightforward. Because the biphase decoding methodology is used, no slice level is required, which greatly reduces the possibility of errors as data is decoded. Further, the selected samples used in the present header consistently have much greater amplitudes than corresponding samples utilized in other data decoding methodologies. This advantage is achieved by ignoring the samples at the edges of the marks and spaces, and evaluating samples at or near the center. This increases the strength of the readout signal levels, thus providing for a more definitive comparison between the two-biphase levels (i.e. marks and spaces).

Utilizing the biphase decoding techniques mentioned above also eliminates the need for DC-offset considerations and gain control loops when dealing with the header. Obviously DC-offset is not an issue since relative signal levels are simply being compared as opposed to the classical slice level decoding techniques. Further, gain control loops can be eliminated because actual amplitude levels are somewhat irrelevant. Obviously, eliminating these two considerations greatly simplifies the reading of address marks and also simplifies all processes required for reading headers, while also improving the reliability.

Again, utilizing asynchronous reading of information eliminates the need for synchronization fields. This frees up a considerable amount of space in the header and allows for the ID fields to be repeated a number of times on both the Land and Groove tracks. The number of repetitions depends upon the chosen channel bit length and the desired header length. Obviously, many variations are possible. Nonetheless, this repetition of ID fields provides reliability and robustness.

As a further example of how the header is simplified, all information contained therein has only three possible run lengths—one for an address mark and two for the data bits. Consequently, pre-formatting of the headers and reading of the headers is straightforward and easily achieved.

Header space is further saved by eliminating the need for sector marks in the present configuration. Appropriate "sector synchronization" is provided by the multiple ID-fields and the error-detection provided by the CRC fields in each ID-field, combined with the fact that these fields can be decoded with an asynchronous clock.

As illustrated by the above summary, it is an object of the present invention to provide a simplified header which is more robust and efficient.

It is a further object of the present invention to provide a header configuration which eliminates the need to utilize a number of fast control loops when reading header information such as PLLs, gain control loops, and DC offset control loops. Eliminating these fast control loops also eliminates the possibility of related errors. As appreciated, the elimination of error sources easily provides a more robust and reliable data storage system.

It is another object of the present invention to more efficiently utilize header space by eliminating the need for long synchronization fields. This again eliminates a possible error source and simplifies the header methodology.

It is still a further object of the present invention to provide increased reliability by adding redundant address fields to the header. This additional redundancy provides for defect and dust tolerance which is greatly improved over traditional header structures.

It is yet an additional object of the present invention to provide increased reliability by eliminating the need of the classical Sector-Mark, which is subject to distortion by small defects and obscuration by small dust particles.

BRIEF DESCRIPTION OF THE DRAWINGS

Further objects and advantages of the present invention can be seen by reading the following detailed description in conjunction with the drawings in which:

FIG. 1 is a layout illustration of the classical synchronized headers used in typical storage media of the prior art;

FIG. 2 is a simplified diagram illustrating the address block utilized in the header of the present invention;

DETAILED DESCRIPTION OF THE INVENTION

Figure 3:
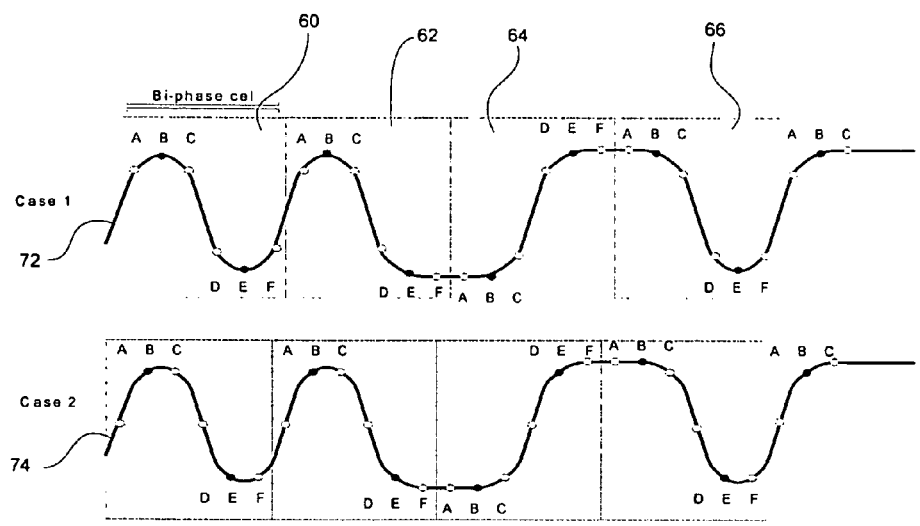
FIG. 3 is a readout trace showing the biphase data coding methodology of the present header.

As mentioned above, the present invention provides a robust header structure which can be used to reliably and efficiently provide sector addressing. The header is specifically designed to be dust and defect tolerant. Further, the design allows for redundancy and eliminates the need for several complex systems.

Referring now to FIG. 2, there is illustrated a general outline of the addressing component utilized in the preferred embodiment. More specifically, FIG. 2 illustrates an address block 40 which is an important component of the header. Address block 40 utilizes a predefined structure which has a gap or space 42 at the initial portion thereof. Secondly, an address mark (AM) 44 is utilized to signal the coming of an address field 46. Address mark 44 is chosen to be a pattern that will not occur in the subsequent addressing code. Consequently, the detection of address mark 44 is easily accomplished. Once detected, address mark 44 will cause the clock to be held at its present setting so that biphase decoding of address field 46 can be accomplished. After reading address field 46, a CRC (Cyclic Redundancy Check) field 48 is detected (also referred to as an error detection field 48). CRC field 46 provides an error checking mechanism for address block 40. More specifically, CRC field 46 is utilized to provide a cyclic redundancy check (CRC) to each address block 40. As recognized by those in the storage industry, the CRC field includes a small number of data bits containing parity information. This can then be used to determine if the preceding data has been correctly read. Stated alternatively, this provides a method for error detection, however does not include error correction features.

As mentioned above, address mark 44 is chosen to be a data pattern that will not occur in the biphase encoded data. As will be further described below, each data bit within the address sector is chosen to have a predetermined number of channel bits. For example, a data bit may have six (6) channel bits. Consequently, the biphase data will consist of either 3T or 6T marks and spaces. Thus, choosing the address mark as having 4T marks and spaces will be easily identifiable.

As will also be outlined below, one method to increase the robustness and reliability of the headers is to repeat address block 40 a reasonable number of times. This repetition provides defect and dust tolerance to the media. This tolerance is especially beneficial to newer media technologies utilizing shorter wavelength lasers and positioning the laser much closer to the media surface, which creates more problems with dust.

As was mentioned above, the header of the present invention utilizes over-sampled biphase coding techniques to store and read address information. Utilizing this over-sampled biphase technique, asynchronous reading of address bits can be accomplished, thus eliminating the need for several relatively complex systems in the readout. More specifically, the asynchronous reading of data eliminates the need to utilize a phase locked loop when reading the headers, and also eliminates the need for gain control and offset adjustments.

Referring to FIG. 3, there is shown two examples of over-sampled biphase coding techniques utilized by the present invention. In the embodiments shown, a first biphase cell 60, second biphase cell 62, third biphase cell 64, and fourth biphase cell 66 are shown. In this particular embodiment, each biphase cell is chosen to have six (6) channel bits. Consequently, the readout may sample at 6 different locations, labeled as A, B, C, D, E, and F. The location of the samplings is dependent upon the existing setting for the channel clock, which is simply held at its previous setting or is tied to a wobbled groove on the media. This channel-clock is the same clock that is used for writing and reading the user-data. In the preferred embodiment this clock is locked to a low-frequency wobble in the grooves on the disk.

Generally speaking, encoding/decoding of biphase data simply involves the sampling at two predetermined locations within the biphase cell, and comparing those two samples to one another. The marks and spaces being read to make up these biphase cells are specifically configured so that a transition will always appear halfway through the biphase cell. In the embodiment shown in FIG. 3 this transition will occur after three (3) channel bits. Consequently, sampling on either side of that transition will provide an indication of the data stored therein. A comparison of these samples can then be utilized to determine the data bit value for that particular biphase cell. For example, a mark-to-space transition (high to low as shown in FIG. 3) will indicate a value of 1 whereas a space-to-mark transition will indicate a data bit value of 0. Using this decoding scheme, the embodiment shown in FIG. 3 has a data bit value of 1 for first biphase cell 60, a value of 1 for second biphase cell 62, a 0 for third biphase cell 64, and a 1 for fourth biphase cell 66. As anticipated, this data coding methodology can simply be continued to provide a sufficient number of data bits for the particular address block.

Again, each biphase cell is specifically designed to have a transition in the middle thereof. Knowing that this transition exists, some level of phase control and later phase adjustment can be accomplished during reading. This is obviously more simplified than the synchronous reading techniques typically used in RLL-coded headers, such as that shown in FIG. 1. However, it does provide a level of frequency and phase control if desired.

As mentioned above, two cases are shown in FIG. 3—case one 72 and case two 74. These two cases illustrate the robustness of this data coding methodology as utilized in the present robust header. In case two 74, the phase has been shifted for each channel bit. Consequently readings have shifted accordingly. However, it can be seen that samples B and E can still reliably provide data bit information. In either case (case 1 or case 2), samples B and E are utilized for data decoding, and all other samples are simply ignored.

The robust header of the present invention allows phase adjustments to be accomplished by simply monitoring the transition in each biphase cell. The preferred embodiment of the present invention utilizes a running phase selector (RPS) to determine if phase adjustments are necessary in the channel clock. While more detail is provided in the discussion of FIGS. 9 and 10, the RPS of the preferred embodiment generally utilizes a counter to monitor any slip in this transition relative to the channel clock. Based upon the values in this counter, phase adjustments are easily accomplished.

Figure 4:
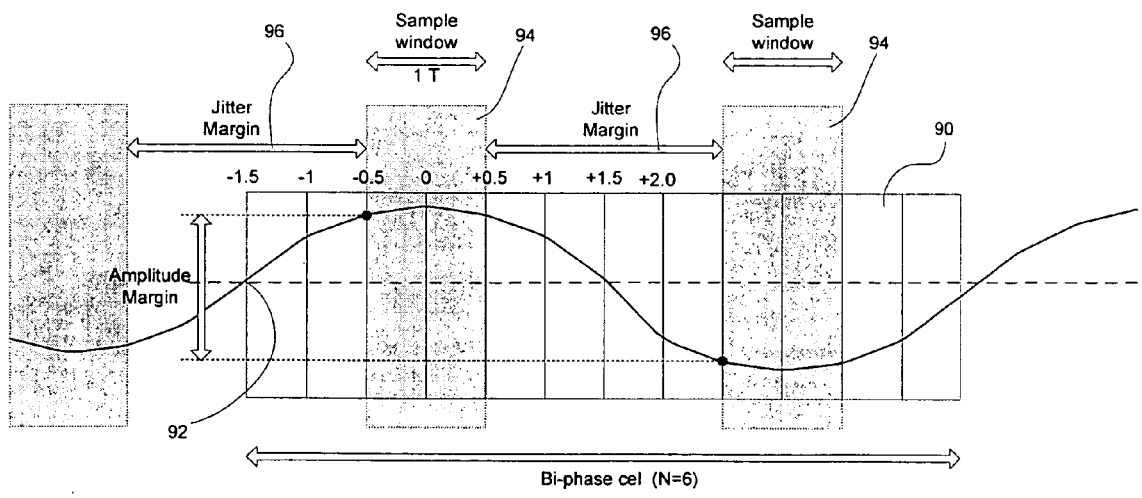
FIG. 4 is another readout trace illustrating the phase margins and amplitude margins for the biphase cells.

Referring now to FIG. 4, the amplitude and jitter margins for one example biphase cell is shown. The biphase cell 90 utilizes six channel bits for each data bit (each "block" in FIG. 4 representing one half of a channel bit). In biphase cell 90 the initial zero crossing 92 is shown at −1.5T and the sample window 94 is centered at 0T and 3.0T. In order to maintain the operability of the biphase cell 90, the phase can shift anywhere within the jitter margin 96. Stated alternatively, so long as any phase shift is below the jitter margin (in this example 2.0T) the outcome will remain the same, because within each biphase cell only the selected samples at T=0 and T=3 are essential for the decoding of a bit. The shaded areas, or sample windows 94 indicate where the T=0 and the T=3 samples may occur due to the asynchronous sampling. Any samples in between the shaded areas are simply ignored.

Figure 11:
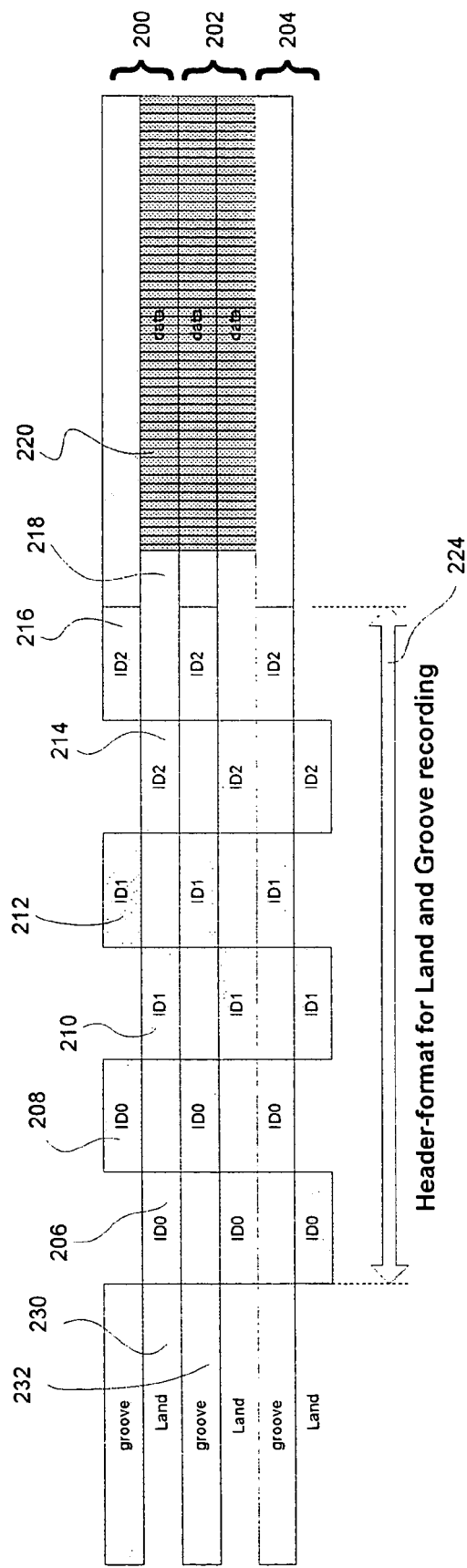
FIG. 11 is a layout drawing very similar to that of FIG. 6, but also illustrating the relationship of data written to the media.
Figure 12:
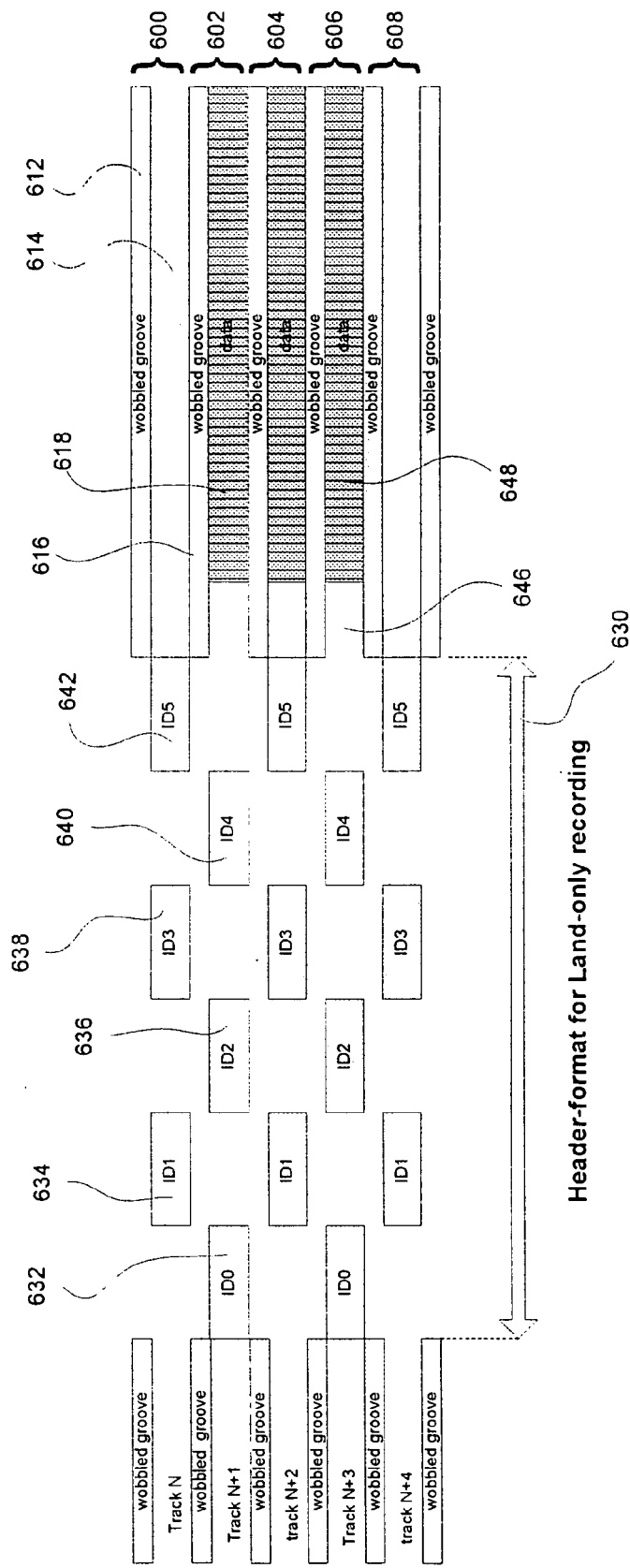
FIG. 12 is an alternative header layout drawing depicting a robust header for use in applications that use only land tracks for recording.
Figure 13:
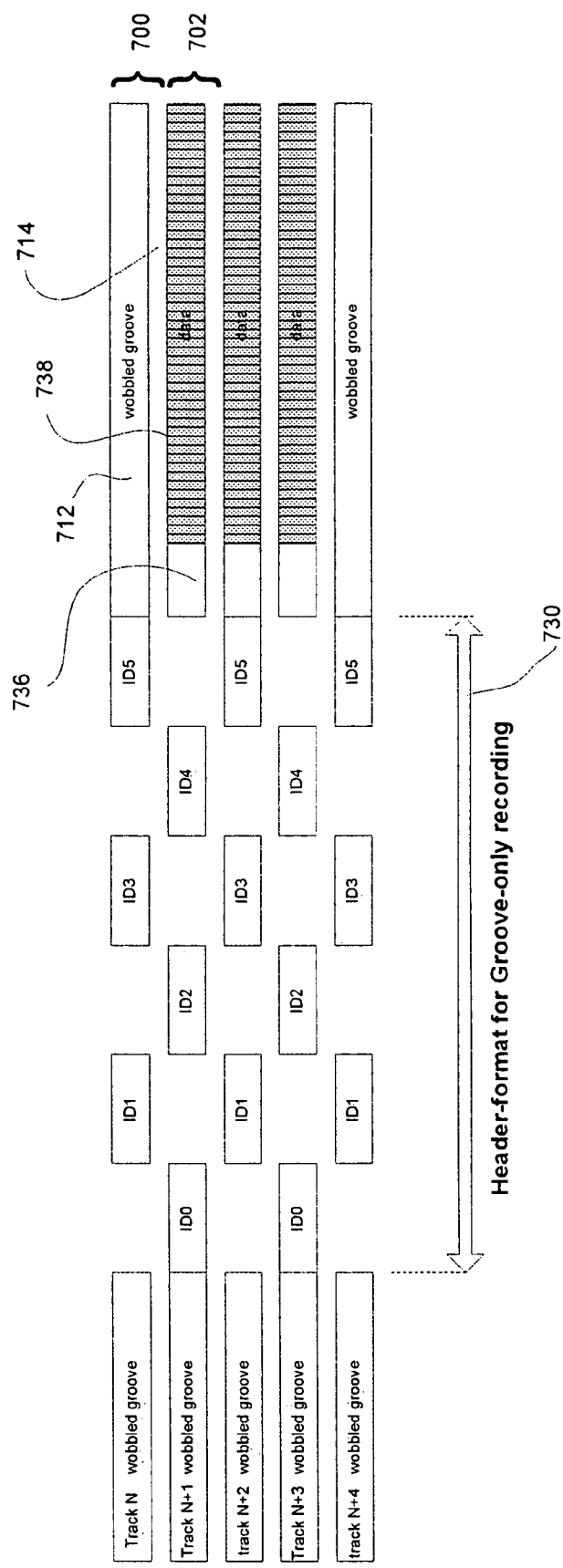
FIG. 13 is yet another alternate header layout drawing, which shows applications that use, only groove tracks for recording.

Once again, the header design of the present invention provides significant dust immunity which is particularly beneficial. Referring now to FIGS. 5, 6, 11, 12, and 13 there are shown various embodiments of a header design, which utilizes the principles of the present invention. In the two embodiments shown in FIGS. 5 and 6 the address blocks are configured to have different sizes of data bits, consequently the respective address blocks in the two figures are of different size. Further, these address blocks are written alternatively to both the land and groove tracks of the storage media. FIG. 12 illustrates another variation wherein information is recorded on only the land tracks. Similarly, FIG. 13 illustrates the header layout for applications, which record on only the groove tracks of the media. These various drawings show alternative header designs, which utilize the principles of the present invention to achieve a robust and reliable header.

Figure 5:
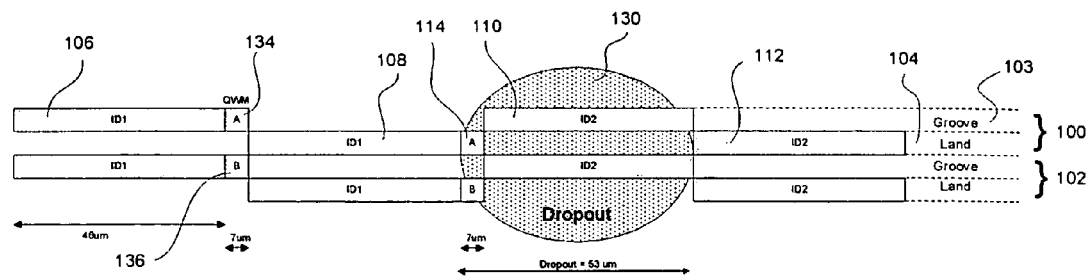
FIG. 5 is a header layout drawing which illustrates a header having eight channel bits per data bit and also showing dropout tolerances.

Referring specifically to FIG. 5 there is illustrated one embodiment of the robust header wherein each data bit is configured to have eight (8) channel bits. Utilizing these sizes, it is possible to provide two repeated address blocks on each land groove pair. More specifically, FIG. 5 illustrates a first groove/land pair 100 and a second groove/land pair 102. First groove/land pair 100 begins an alternating repetition of address blocks. A first address block 106 is initially written to the groove track 103 of first groove/land pair 100. Next a second address block 108 is written to the land track 104 of the first groove/land pair 100. Second address block 108 contains the same information as first address block 106 however being written in this alternative position. Subsequently a third address block 110 and fourth address block 112 are again written to the respective groove and land tracks of first groove/land pair 100. After first address block 106 there exists an optional QWM block 134 (Quadrature Wobble Marks). These are small marks used to insure alignment of the readout. As mentioned, these QWM blocks are entirely optional and are shown to illustrate their potential use. In the preferred embodiment those blocks are omitted, as discussed below. Second groove/land pair 102 includes a similar set of address blocks written to the respective groove and land tracks thereof. Using this type of configuration, a "checker board type pattern" is created for the header. As will be illustrated below, this configuration provides robustness to the header, while also maintaining required radial spacing for embossed data.

FIG. 5 also shows a dropout area 130. This dropout area 130 is intended to represent a dust particle or other type of contamination on the disk which could potentially make that section unreadable. FIG. 5 illustrates some dimensions related to the preferred embodiment which will help describe the dust and contamination tolerance exhibited by this header design. More specifically, FIG. 5 illustrates that each address block (address blocks 106, 108, 110 and 112) are forty-six (46) micrometers in length. Following the first address block 106 there is included QWM region 134 which, in this embodiment, is seven (7) micrometers in length. In order to reliably read the address from the header, it is necessary to read at least one address block pair from the respective track—either the land or groove track. Consequently, dropout area 130 represents the largest tolerable area of the media which could be unreadable, while also providing the ability to produce accurate sector identification information. As can be seen in FIG. 5, the largest possible dropout area is fifty-three (53) micrometers in size. Stated alternatively, a dust particle obscuring as much as fifty-three (53) micrometers of the media surface could be tolerated, without rendering the header unreadable. For comparison purposes, a similar set of dimensions is provided on FIG. 1, which illustrates the largest possible dropout area in that header design. Utilizing the dimensions shown in FIG. 1, it can be seen that a dropout area of twenty-six (26) micrometers could be tolerated. Obviously, a comparison of FIG. 1 and FIG. 5 illustrates that the header design of the present invention greatly improves the dust immunity.

Figure 6:
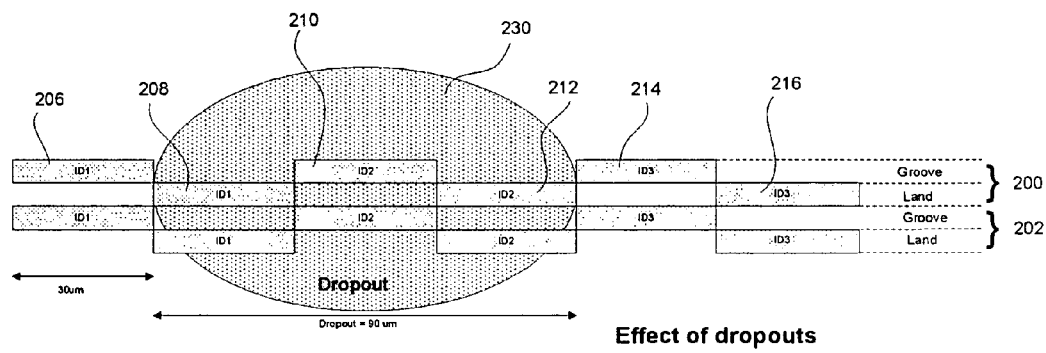
FIG. 6 is a similar layout drawing illustrating a header utilizing six channel bits per data bit and again showing dropout tolerances.

Referring now to FIG. 6 there is shown a layout drawing similar to that of FIG. 5, however having somewhat smaller address blocks. Also, FIG. 6 shows the preferred embodiment of the invention wherein the QWM fields have been eliminated. As mentioned above, each data bit in this particular embodiment is configured to have only six (6) channel bits, as opposed to the eight channel bits used in the embodiment of FIG. 5. Consequently, each address block is smaller in overall size, which changes the configuration somewhat slightly. Most significantly, the smaller address block size provides the ability for more repetition in the header. As can be seen in FIG. 6, the address blocks can be repeated three times on each groove and land track. Consequently, more repetition is provided which has certain advantages.

Referring more specifically to FIG. 6, a first groove/land pair 200 and a second groove/land pair 202 is shown. Each pair includes a first address block 206, a second address block 208, a third address block 210, a fourth address block 212, a fifth address block 214, and a sixth address block 216. These address blocks are alternatively placed on the land and groove tracks of the media. Consequently, the "checker board pattern" is again achieved in this embodiment.

To illustrate dust tolerance, a dropout area 230 is again shown in FIG. 6. In the embodiment shown in FIG. 6, this dropout area is considerably larger, thus showing that a much larger dust piece or particle could be tolerated. More specifically, using similar dimensions, a dropout area of 90 micrometers could be tolerated in this embodiment. Obviously this is a drastic improvement over the prior art header, shown in FIG. 1, and is also better than the embodiment shown in FIG. 5. Naturally, this is just one consideration however when choosing the header configuration most desired and beneficial.

Figure 7:
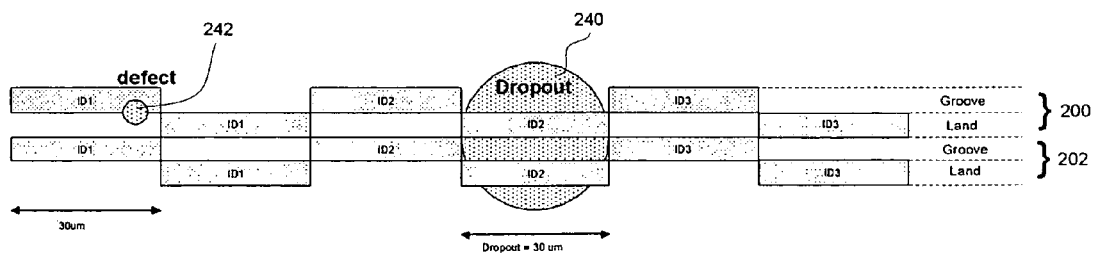
FIG. 7 is a layout drawing showing combined defect and dropout tolerances for the header utilizing six channel bits per data bit.

Referring to FIG. 7, the defect immunity of the header design is considered. In FIG. 7, the actual information layout is identical to that in FIG. 6, however the dropout area 240 has been modified because a defect area 242 is also shown. In this illustration, defect area 242 is meant to illustrate a pinhole or surface defect in the media itself. Typically these defects are much smaller in magnitude than dust contamination. Assuming that defect area 242 exists at some point within the header, the largest possible dropout area 240 must also be adjusted accordingly. As can be seen, this dropout area in FIG. 7 however is still larger than that shown in the prior art header of FIG. 1. Consequently the combined dust and defect immunity is improved.

The advantages outlined above in relation to FIG. 5-7 are also achieved by various alternative embodiments of the present header. Referring to FIGS. 11-13, examples of three alternative embodiments are shown (with each address block having the same size). These embodiments illustrate the robust header design of the present invention as applied to media, which utilizes land and groove recording, land-only recording and groove-only recording. The header embodiment shown in FIG. 11 is virtually identical to that shown in FIGS. 6 and 7. As can be seen, three groove/land pairs are shown—first pair 200, second pair 202 and third pair 204. As discussed above, multiple address blocks (i.e., 206, 208, 210, 212, 214, 216) are utilized in the desired checkerboard format to make up header 224. Following a short overhead field 218 (typically used for synchronization and set-up processes), data is written to the disk in various data fields 220. As can be seen in this embodiment, data is written to both land track 230 and groove track 232. In this particular embodiment there is no data shown as written to the outer tracks. It will be understood that these tracks could also include data.

Referring to FIG. 12, an alternate embodiment is shown, which again has a plurality of land/groove pairs 600, 602, 604, 606 and 608. First land/groove pair 600 includes a wobbled grove 612 and a land track 614. In this embodiment, the storage media is configured such that all data is written exclusively to the land tracks (labeled as track N, track N+1, track N+2, . . . ). As will be appreciated, the wobbled grooves are then simply used for synchronization and alignment functions. The other land/groove pairs similarly include a respective wobbled groove and land track (e.g., second land/groove pair 602 includes a wobbled groove 616 and a land track 618, etc.).

Referring to the header section 630, shown in FIG. 12, it can be seen that a plurality of address blocks are written alternatively to adjacent land tracks. More specifically, first land track 614 and second land track 618 contain six different address blocks, including first address block 632, second address block 634, third address block 636, fourth address block 638, fifth address block 640, and sixth address block 642. As mentioned above, these address blocks are written alternatively to the two adjacent land tracks in the desired checkerboard fashion to achieve necessary spacing. Specifically, first address block 632, third address block 636, and fifth address block 640 are written to second land track 618, while second address block 634, fourth address block 638, and sixth address block 642 are all written to first land track 614. Utilizing this layout, the above-mentioned advantages of dust and defect immunity are likewise achieved utilizing only the land tracks of the storage media. As also shown in FIG. 12, data is written to only the land tracks. Following header section 630, an overhead field 646 exists to allow synchronization and other functions. Data is then written to a data field 648. Again, data is shown as written to only selected land tracks. It is understood that the outermost land tracks (e.g., land track 614) could also include data.

A similar layout is shown in FIG. 13, however utilizing only the groove tracks of the media. Once again, a first land/groove pair 700 and a second land/groove pair 702 are shown. First land/groove pair 700 includes wobbled groove 712 and a land track 714 in header portion 730 multiple address blocks are again written in a checkerboard fashion, however using only the groove tracks. Following header 730 are similar overhead fields 736 and data fields 738. FIGS. 11-13 illustrate some variations can be utilized, while still taking advantage of the features of the present invention.

As mentioned above, the header of the present invention is read with an asynchronous clock and using "biphase decoder". One method for locating headers on blank or fully written tracks is to look for the address marks. However, address marks are not unique patterns and may be recorded 1, 7 RLL data. Consequently, those same patterns may be seen several times in the data field. When using a biphase decoder, however, the probability of getting the proper CRC matching when address marks are found in the 1, 7 RLL-coded data is extremely small. Consequently, an address mark followed by a good CRC status clearly indicates that this is intended as an address mark. Utilizing this logic to detect address marks provides the possibility of achieving sector synchronization without the classical sector mark. Referring to FIGS. 5-8, 11 and 12, it can be seen that no sector marks are used in these embodiments.

Figure 8:
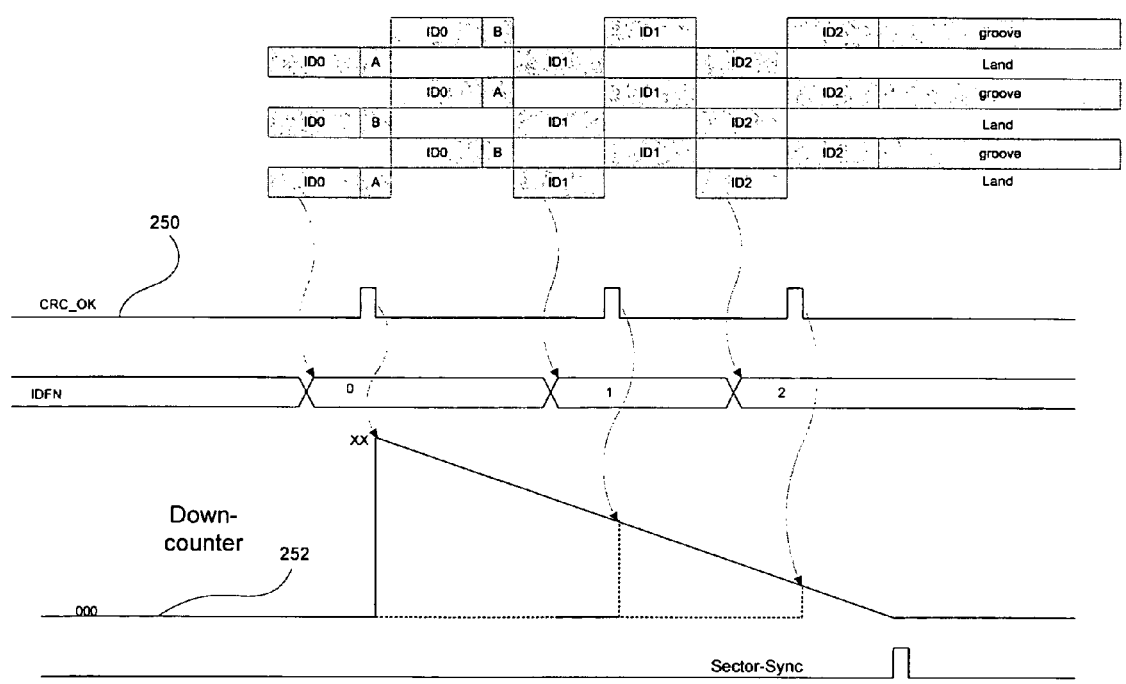
FIG. 8 is a timing diagram illustrating sector synchronization.

Typically, an address mark followed by good CRC status will occur 3 times per header (when the embodiment shown in FIG. 6 or 7 is used), each with its own ID number. FIG. 8 illustrates how these ID numbers can be utilized, along with a down counter to provide very robust sector synchronization. Only one of the three ID-fields is required to generate the sector-sync pulse, because each ID-field will set the down counter to the proper value.

Using CRC check circuitry, the readout of the present invention can produce CRC okay signal 250 after reading each ID field. Each of the ID fields can be identified by a unique number embedded therein, which is shown in FIG. 8 as ID0, ID1, ID2. Each of these identifiers can be used to set the downcounter to its proper value. The downcounter is illustrated at 252 in FIG. 8, and shows how receipt of the first CRC okay signal causes the down counter to be set to a defined number (XX) and commences operation of that component. Likewise, the second CRC okay pulse will cause the down counter to be loaded with yet another value. Similarly, a third CRC okay pulse will similarly result in the reloading of the down counter with an appropriate value. Upon the coordinated occurrence of all of these events, a sector synchronization pulse is then produced after the down counter reaches its 0 value. Obviously, this methodology provides three opportunities to provide sector synchronization, without the use of a defect prone sector mark.

Figure 9:
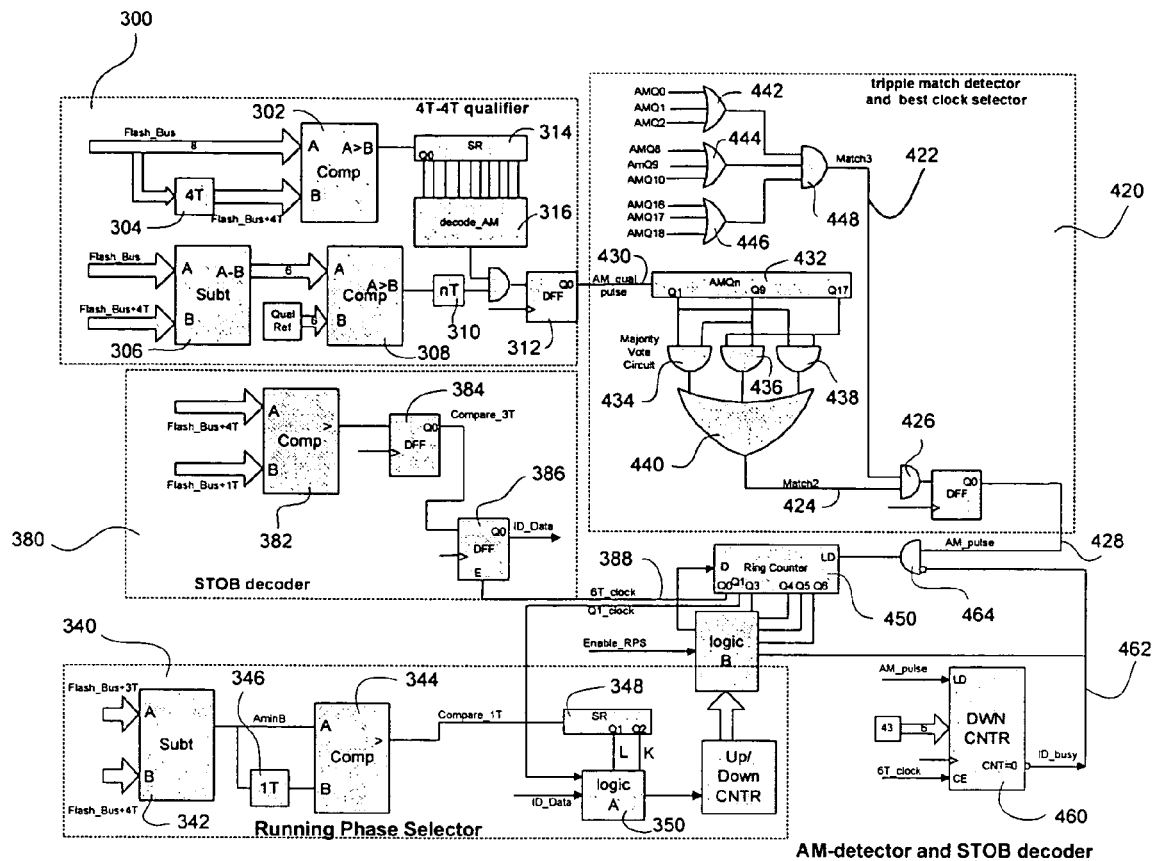
FIG. 9 is a block diagram illustrating circuitry necessary to read the header of the present invention.

Referring now to FIG. 9 there is shown a detailed schematic illustrating certain components utilized in the data storage system to implement this header configuration. More specifically, FIG. 9 illustrates a 4T-4T qualifier 300, a running phase selector 340, STOB decoder 380 and a match detector 420. In the discussion below, these subsystems are described recognizing that this system is set up assuming that the data bits again have six (6) channel bits.

Referring now to the 4T-4T qualifier 300, this subsystem is obviously used to detect address marks utilized in the present robust header. As discussed above, the biphase address data utilized (when each data bit includes six (6) channel bits), will result in 3T and 6T marks and spaces. Consequently, 4T marks and spaces are utilized for address marks, thus signifying the present of a sector identifier. 4T-4T qualifier receives the flashbus signal (readout signal) and provides that to a first comparator 302. This is also provided to a 4T delay 304, whose output is also provided to comparator 302. Comparator 302 can thus determine the relative value of the readout, four (4) channel bits apart. The same inputs provided to comparator 302 are also provided to subtractor 306, which is used to determine the difference in magnitude at the prescribed four (4) channel bit separation. The output of subtractor 306 is then provided to a second comparator 308 to determine if the amplitude difference is above a predetermined threshold. The output of second comparator 308 is then provided to a delay 310 and subsequently to a logic gate 312. Referring back to the first comparator 302, its output is provided to a shift register 314 which retains the relative relationships as data is clocked through the system. The various outputs of shift register 314 are then provided to a decoder 316 so that the relative 4T-4T pattern can be recognized. Once the appropriate relationships are obtained in shift register 214, decoder 316 will output a signal to logic block 312, thus indicating that a 4T-4T address mark has been identified.

As also mentioned above, running phase selector 340 (RPS) is utilized to track zero crossings in the middle of the biphase cells. Referring specifically to running phase selector 340, this subsystem includes a subtractor 342 which is utilized to compare values that are one (1) channel bit apart.

In this case, the inputs are shifted by three clock bits (3T) and four clock bits (4T) respectively to obtain proper timing. The output of subtractor 342 is then provided to a comparator 344 and a delay 346. The output of delay 346 is also provided to comparator 344, thus providing an output signal which is indicative of the magnitude differences between adjacent clock readings. This signal is then provided to a shift register 348 and subsequently a logic block 350. These two components thus provide an indication regarding the zero crossing within the biphase cell.

STOB (Six Times Oversampled Biphase) decoder 380 is utilized to decode the data contained in the biphase cells. As illustrated and discussed in FIG. 3 above, the system of the present invention simply examines two (2) relative channel bits within each biphase cell to decode the data. Referring to FIG. 3 specifically, these two (2) sample bits are indicated as sample B and sample E within each biphase cell. Referring now to FIG. 9, it can be seen that decoder 380 receives two (2) relative inputs at comparator 382. These two (2) relative inputs are timed so that they are the appropriate channel bits within the biphase cell. In the embodiment shown in FIG. 3, these appropriate channel bits are the second and fifth channel bits, thus the input is labeled as flashbus +1T and flashbus +4T. The output of comparator 382 is then provided to a first output 384. The output from comparator 382 simply indicates the relative relationship between the two samples (i.e., which is greater than the other). Again, the output from comparator 382 is provided to flip flop 384 which has its output provided to a second flip flop 386. The output from second flip flop 386 is then indicative of the data bit value for the particular biphase cell being examined.

Once again, the address mark within each address block 40 actually consists of three repetitions of the 4T-4T pattern. All three need to be detected. Recognizing that the asynchronous sampling of this pattern may not be read perfectly and additional considerations are necessary.

As outlined above, the 4T-4T qualifier 300 accepts either one of the following patterns: x11110000x or 1111000xx or xx1100000. (x=don't care, 1=mark, 0=space). Match detector 420, or "tripplematchdetector," checks for the occurrence of three qualified 4T-4T pattern. Match3 output 422 indicates that all three of them were recognized, but it allows them to occur at the specified interval +/−1T. Match2 output 424 indicates that at least two of them occurred at exactly the specified interval.

If both Match2 output 424 and Match3 output 422 are received by gate 426, an AM_pulse 428 is generated, which pre-sets the ring-counter 450. Upon receipt of AM_pulse 428, ring-counter 450 wraps after every 6 clocks to provide the STOB timing (i.e., the 6T clock 388). In order to prevent a possible disturbance to the "synchronization" of ring counter 450, down counter 460 is utilized. More specifically, Am_pulse is provided to down counter 450, which then outputs an ID_busy signal 462 for a predetermined time. This ID_busy signal 462 is then provided to a logic gate 464, so that any possible false AM detect signals are blocked from going to ring counter 450. To achieve appropriate timing, the ID_busy signal 462 is generated for a period substantially equal to the length of an ID field.

As discussed above, RPS 340 may adjust timing to provide "pseudo-synchronization" for the header. This is achieved allowing the RPS 340 to temporarily change the ring-counter 450 to a 5T or a 7T period.

As shown in FIG. 9, the AM_qual pulse 430 is received by shift register 432, indicating when the 4T-4T pattern is recognized. Shift register 432 then outputs signals to logic gates 434, 436, 438, and 440 to produce the above-referenced Match2 signal 424. Similarly, shift register 432 will output signals to a combination of logic gates 442, 444, 446 and 448 to produce Match3 signal 422. Naturally, other implementations are possible to achieve the desired logic.

Figure 10:
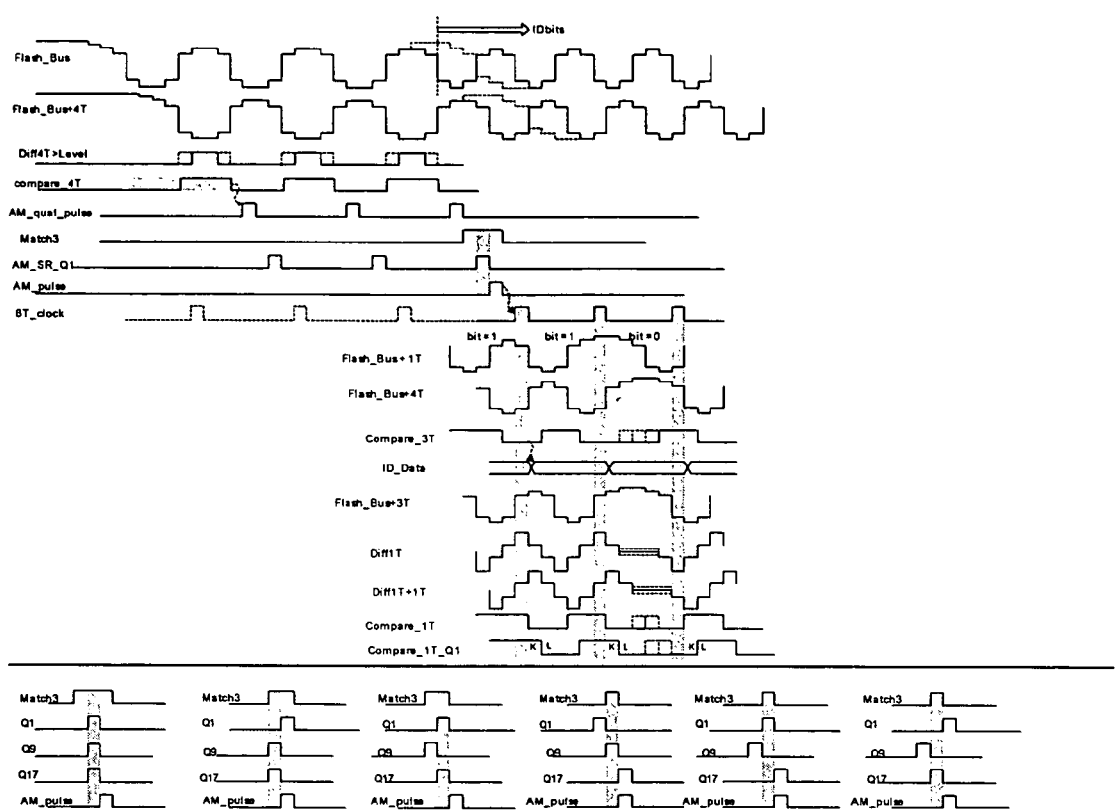
FIG. 10 is a timing diagram illustrating operation of the circuitry shown in FIG. 9.

FIG. 10 illustrates the timing of several signals within the circuitry of FIG. 9. This is helpful in showing how match detector 420 recognizes that three consecutive 4T marks have been recognized, thus producing an appropriate signal (AM_pulse).

As can be seen above, the present invention provides a robust and reliable header which is capable of reading address information consistently and reliably. Further, the header is designed to be robust and dust tolerant so that it can operate in diverse operating environments. As discussed, the various sizes of the biphase cells, and the relative dimensions of the header can vary somewhat. Specifically, one embodiment repeatedly discussed above utilizes six (6) channel bits for each biphase cell. It will clearly be understood that eight (8) channel bits, ten (10) channel bits or any number could also be utilized.

The above embodiments of the present invention have been described in considerable detail in order to illustrate their features and operation. It is clearly understood however that various modifications can be made without disparting from the scope and spirit of the present invention.

What is claimed is:

1. A storage disk, comprising:
a plurality of sectors positioned on a surface of the storage disk so as to be read by a storage device, each sector having a header section and a data section;
wherein the header section comprises a plurality of address blocks, each address block containing an address mark followed by an address field, each address field within a sector having the same address data coded in a biphase format for identifying sector address, each address mark being distinguishable from the biphase coded address data.

2. The storage disk of claim 1 wherein the plurality of sectors are positioned on adjacent land and groove tracks and the respective address sections are repeated alternately on the land track and groove tracks in a checkerboard format.

3. The storage disk of claim 1 wherein the address data is sampled with an asynchronous clock.

4. The storage disk of claim 3 wherein the address data includes a predetermined number of data bits with each data bit being a predetermined number of channel bits long, wherein each data bit includes a mark-space or space-mark transition at a predetermined location.

5. The storage disk of claim 4 wherein the address data is six channel bits long and includes a 3T mark and a 3T space.

6. The storage disk of claim 1 wherein the address data is embossed.

7. The storage disk of claim 1 wherein the address section further includes an error detection field.

8. The storage disk of claim 5 wherein the address mark is made up of marks and spaces four channel bits long.

9. The storage disk of claim 4 wherein the address mark is made up of marks and spaces each having a length not equal to one-half the predetermined number of channel bits making up the data bits.

10. A storage media for use in a data storage system, comprising:
a storage substrate having a storage surface with a plurality of groove tracks and land tracks, the storage surface having a plurality of storage sectors for storing data with each storage sector comprising a header and a data storage field;
wherein the header is configured to have a plurality of repeated address blocks; and
wherein each of the plurality of address blocks comprise an address mark, an address field, and a error check field, the address field made up of a plurality of biphase cells to store a sector address in a biphase data format and the address mark made up of a distinct signal not found in the address field.

11. The storage media of claim 10 wherein the address blocks of adjacent tracks are written to both the land and groove tracks and are configured in a checkerboard format.

12. The storage media of claim 10 wherein only the land tracks are utilized and the address blocks of adjacent land tracks are written in a checkerboard format.

13. The storage media of claim 10 wherein only the groove tracks are utilized and the address blocks of adjacent groove tracks are written in a checkerboard format.

14. The storage media of claim 10 wherein each biphase cell is configured to have a mark-space or space-mark transition at a point in substantially the center of thereof.

15. The storage media of claim 14 wherein each biphase cell has a predetermine size comprising a predetermined number of channel bits.

16. The storage media of claim 15 wherein the predefined number or channel bits is six in length and the biphase cell includes a mark and a space, each being three channel bits in length.

17. The storage media of claim 15 wherein the predetermined number of channel bits is eight in length and the biphase call includes a mark and a space, each being four channel bits in length.

18. The storage media or claim 16 wherein the address bit comprises marks and spaces four channel bits in length.

19. The storage media of claim 14 wherein the address marks are made up of marks and spaces of a size not occurring in the biphase cell.

20. A method of configuring a storage media for robust addressing, comprising:
defining a plurality of storage sectors on the storage media;
defining a header field with each storage sector; and
embossing a plurality of address blocks within the defined header field, each address block beginning with at least one address mark having a predetermined configuration, followed by an address field made up of a plurality of biphase cells, each biphase cell having a mark and a space with a transition in substantially the center thereof, the address block ending with an error detection code.

21. The method of claim 20 wherein each biphase cell is a predetermined number of channel bits long and the marks and space within each biphase cell each fill substantially one half of the biphase cell.

22. The method of claim 21 wherein the address marks are made up of marks and spaces having a dimension unequal to the marks and spaces within the biphase cells.

* * * * *